Dec. 20, 1949 C. V. KENT 2,491,667
HARDNESS TESTER
Filed Nov. 15, 1945 2 Sheets-Sheet 1
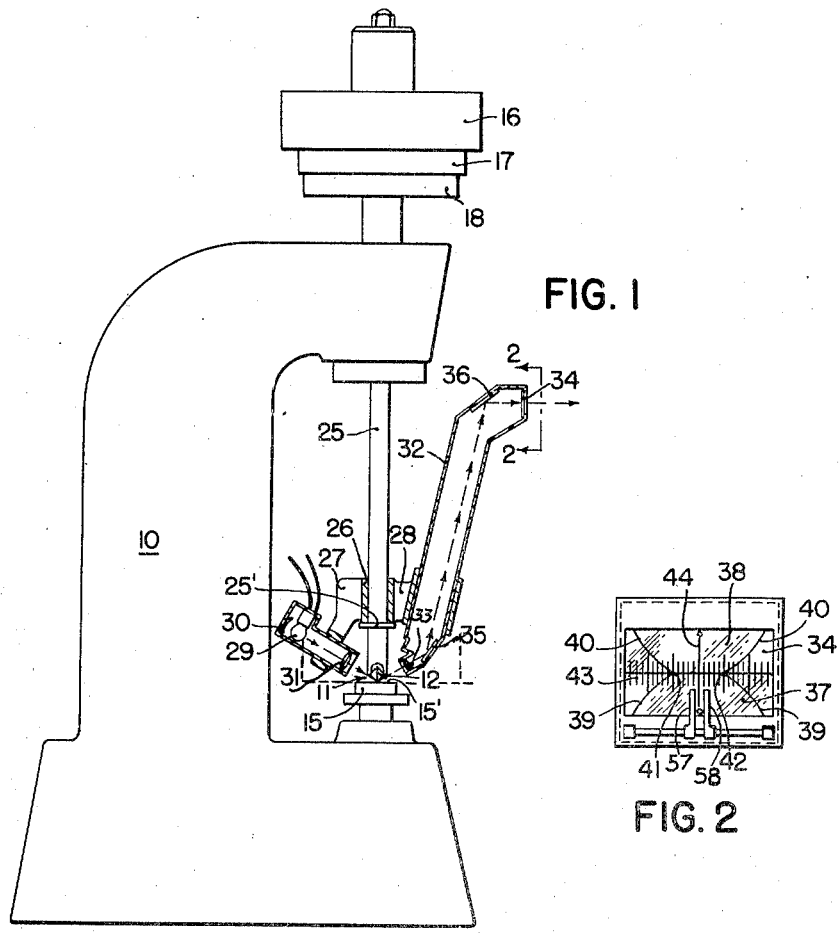
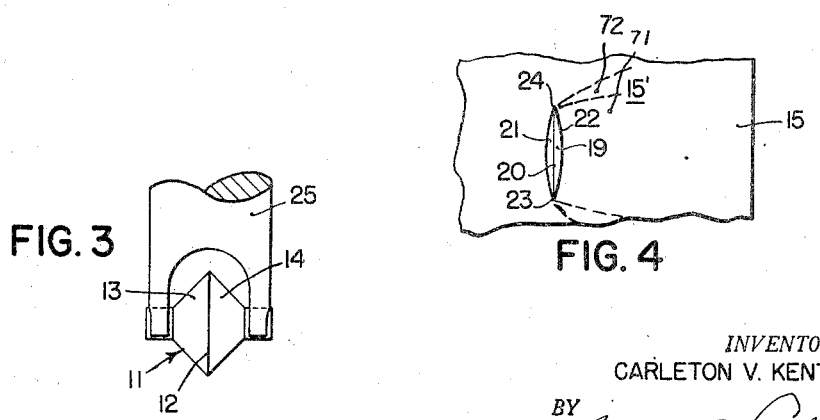
INVENTOR.
CARLETON V. KENT
BY Bruno C. Lechler
ATTORNEY Dec. 20, 1949 C. V. KENT 2,491,667
HARDNESS TESTER
Filed Nov. 15, 1945 2 Sheets-Sheet 2
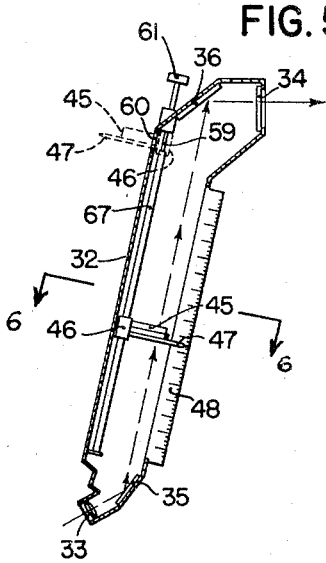
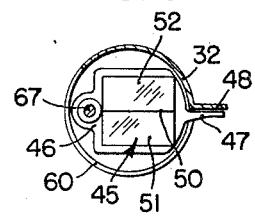
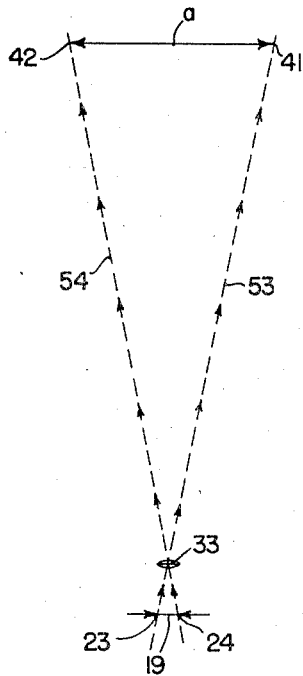
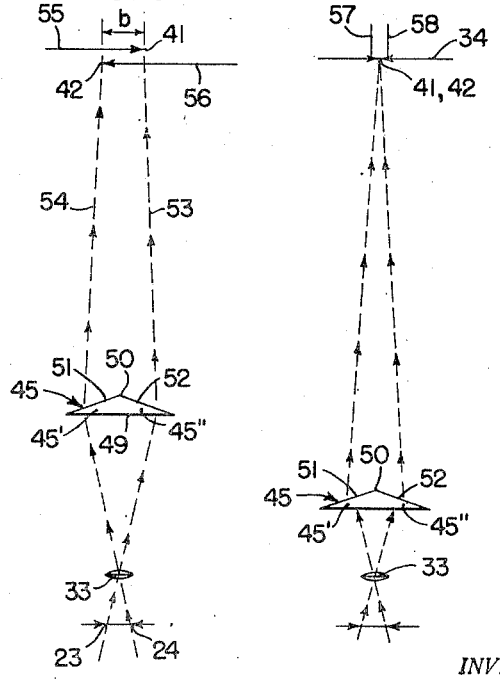
INVENTOR.
CARLETON V. KENT
BY
Bruno C. Lechler
ATTORNEY Patented Dec. 20, 1949

2,491,667

UNITED STATES PATENT OFFICE 2,491,667

HARDNESS TESTER

Carleton V. Kent, Perkasie, Pa., assignor to American Machine and Metals, Inc., New York, N. Y., a corporation of Delaware Application November 15, 1945, Serial No. 628,795

5 Claims. (Cl. 73—81)

This invention appertains to the art of determining the hardness of a specimen by measuring some dimension of an indentation produced in that specimen by an indenting tool. The invention relates to a new method of determining hardness based on this principle and to apparatus particularly adapted to carry out this method.

The "hardness number" of a specimen is the magnitude of the chosen dimension of the indentation which is produced by a predetermined test load applied to the indenter. This dimension may be of the diameter of the imprint left by a small steel ball (Brinell system), a diagonal of the impression of an axially symmetrical four-sided pyramid (Vickers system), the long diagonal of the impression of a pyramid having a diamond-shaped base (Knoop system), the length of a lenticular-shaped impression of a double coaxial-cone indenter (Kent system) as is described in my copending application, Serial No. 579,857, filed February 26, 1945 and now Patent No. 2,436,435, or the depth of the indentation left by a ball or a cone (Rockwell system).

The invention herein described is particularly well adapted for use with the Vickers and Kent systems. The general object of the invention is to provide a method of testing hardness and a device which permits conveniently carrying out the method, which will permit making hardness tests of great accuracy with greater ease and more speedily than has been heretofore possible.

In determining the hardness of a specimen by measuring some dimension or dimensions of the indentation produced by hte indenting tool, the common practice has been to view the indentation through a measuring microscope. A detached microscope is used at times, but more generally the microscope is attached to the hardness tester. In either case it is necessary to move either the indenting tool or the specimen relative to the microscope so that the specimen will be in position under the indenter for making the indentation and under the microscope for reading the dimensions. Generally, refocussing of the microscope becomes necessary for each observation. In most cases it is necessary to read the position of each end of the indentation separately on a scale in the eye-piece of the microscope and then to calculate the desired quantity from the two observations. Since this procedure is rather time-consuming and attended by serious eye-strain, it has been proposed to substitute a projection system which casts a magnified image of the indentation produced upon a ground glass screen. This requires moving the indenter out of the way, generally by a vertical movement of the indenter followed by a lateral movement.

It is an object of this invention to provide a method of testing hardness which permits observing the chosen dimension of the specimen while the specimen remains in the testing machine without using a microscope and without any movement of the indenter other than its axial movement during the indenting of the specimen. In particular, it is an object of the invention to provide a hardness testing method which permits reading the chosen dimensions while the indenting tool rests in the specimen. To accomplish this purpose, my method provides illuminating the indentation by a light beam directed upon the indented surface at an acute angle so that the chosen dimension can be observed by an observer looking in the direction of the reflected light beam at the shadow cast. When thus observed the contrasts between the light and the dark areas are sharpest, permitting accurate observations.

Another object of the invention is to provide a hardness testing method wherein an enlarged image of the indentation is projected onto an observation plane by taking advantage of the increased reflecting power of any material when the angle of incidence of the light beam upon the reflecting surface is sufficiently small. Below a certain angle of incidence even surfaces which are ordinarily not regarded as reflecting surfaces, such as a dull black, soft rubber surface, become reflecting to a sufficient degree under intense illumination. The expressions "angle of incidence" and "angle of reflection" as used in this specification are to be understood as denoting the angles the incident and the reflected light beams, respectively, include with the surface of the specimen.

When thus viewed under illumination thrown upon the specimen at a small angle of incidence by an observer whose eye is located in the reflected beam, the light which is reflected from the surface lying beyond the indenting tool will sharply illuminate the outline of the indenting tool edges. The shadow cast upon the specimen by the indenting tool will also be visible. This shadow will have a dark portion, the umbra, and a confused outer fringe, the penumbra. But as the shadow converges toward the point of indentation, the penumbra disappears and there is a perfectly sharp shadow. This umbra and the near side of the indenting tool will both appear dark because of the absence of reflected light, while the area surrounding the indenting tool and its shadow will be bright with reflected light. It is a further object of the invention to provide a method of testing hardness wherein the indenter is left in the indentation and the intersecting outline of that portion of the tip of the tool which extends out of the surface and the shadow is observed.

It is a further object of the invention to provide a hardness testing machine wherein during the reading period the indenting tool is left in the indentation and the intersecting outline of that portion of the tip of said tool which extends out of the indented surface and of the shadow thereof cast upon this surface is observed.

A further object of the invention is the measuring of the enlarged reflected image by a movable scale requiring only a single reading to give the "hardness number."

A further object of the invention is the provision of a hardness testing method, wherein an indentation of elongated shape, preferably of lenticular shape, is produced in the specimen and the tool producing that indentation is retained therein during the reading, which is carried out under light directed onto the indented surface of the specimen and reflected therefrom under a small acute angle of incidence and reflection, respectively.

A still further object of the invention is to provide a method of testing the hardness of a specimen by noting the amount of movement of a portion of an optical system required to bring the images of two points of the indentation into a fixed relationship. In a preferred form of the invention the light rays reflected from the specimen at the two ends of the indentation are deviated until the two light rays coincide on a screen. The hardness is determined by noting the movement of a portion of the optical system that is required to achieve this coincidence of the two rays on the screen.

Another object of the invention is to increase the accuracy of the readings of the hardness of a specimen as determined by an indenting tool by substituting for the measurement of the microscopically small dimension of the indentation the position of an element of an optical system relative to a long, readily observed, scale.

A further object of the invention is to provide an apparatus in which light rays from two parts of an object can be deviated to coincide on a screen by a portion of the optical system, which portion of the optical system is displaceable into a position outside of the path of those rays if it is desired to observe the actual image of the indentation on the screen.

Still a further object of the invention is to provide a hardness testing device wherein the indenting tool and at least those optical elements which serve as focussing means are so arranged and coordinated that the latter will maintain a fixed relationship to the tool irrespective of movements required of the tool for enabling the insertion or the removal of the specimen and the application of the indenting tool to the specimen.

Other objects and advantages of the invention will appear as the description proceeds, reference being had to the accompanying drawings, in which:

Fig. 1 is a diagrammatic side elevation, partly in section, of a hardness testing machine embodying one form of the invention;

Fig. 2 is a front view at a larger scale of a graduated projecting screen as used in the device of Fig. 1;

Fig. 3 shows in a side view an indenting tool or penetrator;

Fig. 4 is a plan view of the impression made in the specimen by the penetrator shown in Fig. 3;

Fig. 5 shows in a vertical section a modification of the optical equipment and indicating means of the machine;

Fig. 6 is a section along the line 6—6 in Fig. 5;

Fig. 7 illustrates diagrammatically a beam of light as delivered by a projecting lens, whereas Figs. 8 and 9 indicate the deviation to which the rays of such a beam of light become subjected when passing through a double prism, Figs. 8 and 9 showing two different positions of this prism, resulting in two different degrees of distortion of the beam.

Referring first to Figs. 1–4, 10 denotes generally the framework of a hardness testing machine having an indenting tool or penetrator 11 carried by a rod 25. The indenting tool 11 is of tapered shape and preferably either of the diamond shaped Knoop type or, as shown, of the type described in my co-pending application Serial No. 579,857. The indenting tool shown has a single cutting edge 12 formed by the intersection of two co-axial cones 13 and 14. The shape of the cutting edge 12 is that of an arc of a circle. If a penetrator of the double conical shape just described is used, this penetrator, when forced against the specimen 15 under the test load supplied by weights 16, 17, and 18 cooperating with the conventional hydraulic mechanism (not shown), an impression or indentation 19 of the lenticular shape shown in Fig. 4 will be produced in the specimen 15. This lenticular indentation is bisected by the line 20 created by the cutting edge 12. The side walls 21 and 22 of the indentation 19 are curved surfaces corresponding to small portions of the conical surfaces 13 and 14 of the penetrator. At each of the two ends 23 and 24 of the lenticular figure 19, the sides of the latter and the line 20 join in a single point. The distance between the points 23 and 24 may be used as an indication of the hardness of the particular specimen tested.

Secured to the rod 25 is a double bracket 26 whose two arms 27 and 28 extend from the rod in opposite directions. The arm 27 carries an illuminating system consisting of a lamp 29, a reflector 30 and a condensing lens 31. The other arm 28 carries a holder 32 for a projecting lens 33 and a projection surface 34, e. g., a ground glass screen. While the screen 34 could be arranged perpendicularly to the optical axis of the projecting lens 33 at a desired point of said axis, it will, in general, be more convenient for easy observation to place the projection surface 34 outside of the optical axis of the projection lens 33. Such an arrangement is shown in Figs. 1 and 5 where the image formed by the projection lens 33 is directed to the projection surface 34 by suitable optical means, such as two mirrors 35 and 36, for a double change of direction of the light beam after the latter has passed the projection lens 33.

The optical axes of the lenses 31 and 33 form equal acute angles with the surface 15' of the specimen 15. It is well known that the reflecting power of a surface and the percentual amount of reflected light increases with the obliquity of the incident light. In order to obtain maximum reflection of light from the surface 15, the angle at which the incident rays impinge upon that surface should be chosen as small as practicable. I have found that if the angle of incidence is chosen not larger than 30°, the major part of the incident light is reflected into the projecting lens 33 and the image cast by that lens is sufficiently bright and contrasting for eye comfort and accurate reading no matter whether the surface 15' is a very dull one, such as the surface of a piece of black soft rubber or so light-pervious as the surface of a piece of transparent plastic.

The surface 15' of the specimen 15 is illuminated by means of the illuminating system 29, 30, 31 to a high degree of brightness and in a preferred form of the invention the observation of the indentation is made while the indenting tool 11 rests in the indentation 19. In this case there are visible on the screen 34 an inverted, enlarged image 37 (Fig. 2) of the unilluminated side of that part of the tip of the tool 11 which extends out of the indentation, and an enlarged, inverted image 38 of the shadow cast on the surface 15' by the same portion of the tip of the tool 11. Both these images appear dark against the background of light reflected from the surface 15' into the projection lens 33. If the indenting tool is tapered, as is the case with all the types of indenters mentioned at the beginning of this specification, the outlines 39 and 40 of the images 37 and 38 will intersect in two points 41 and 42. As the indenter 11 shown in Figs. 1 and 3 has a cutting edge 12 of circular shape, the outlines 39 and 40 of the images 37 and 38 are correspondingly curved. The points 41 and 42 in which the two curves 39 and 40 intersect and which correspond to the points 23 and 24 to which the curved indenter edge 12 has penetrated the specimen, are well defined and easily observable on the projection surface 34. This holds true in spite of the fact that the shadow produced on the surface 15' is composed of two zones of markedly unequal density: the uniformly dark umbra 71 where no rays of light impinge upon the surface 15', and the penumbra 72 where diverging rays of light passing the indenter edge strike the surface 15', said penumbra growing the wider and the more diffuse the farther away from the surface 15' the particular point of the indenter edge casting the shadow is. On the other hand, the smaller the distance between a point of the indenter edge and the surface 15' is, the narrower will be the penumbra for that point. For the points 23, 24, this distance is zero and the light striking the indenter edge at these points has no spread at all, that is to say, there is no penumbra at all. Thus, the shadow at the points 23, 24 is perfectly sharp and in consequence thereof, perfectly sharp images 41, 42 of the points 23, 24 can be obtained on the screen 34.

The distance between the two points 41 and 42 is proportional to the distance between the points 23 and 24 and is therefore indicative of the depth the indenting tool has penetrated the specimen and, thus, of the hardness of said specimen. Depending on the optical system used for the projection, and the adjustment thereof, the ratio between the distances 41—42 and 23—24 may be made larger or smaller and there is no difficulty in providing for an image on the projection surface 34 enlarged enough to enable easy reading of the distance to be measured.

To permit direct reading of the distance 41—42 in desired units, the projection surface 34 is provided with a scale 43 whose divisions are of sufficient size for easy reading. The scale 43 may be movable in its own plane with, or relative to, the screen 34. If the scale 43 is moved so that the zero mark 44 of the scale coincides with the position of the point 41, then the division of the scale coinciding with the point 42 will denote directly the distance between the points 41 and 42. Since this distance corresponds directly to the hardness number, the scale may be marked in terms of such hardness numbers.

If desired, the device illustrated in Figs. 1 and 2 may be used for illuminating and observing the indentation made in the specimen after the indenting tool has been withdrawn from the specimen. In this case, the connection between the indenter and the optical system may be such that the indenter can be moved relative to the optical system. On removing the indenting tool from the impression, while the optical system remains focussed on said impression, there will be some distortion of this impression in the direction perpendicular to the line 20 (Fig. 4), but since there is no distortion as far as the position and the distance of the points 23, 24 is concerned, where the curved surfaces of the indentation and the edge 20 meet, measuring of the distance 23—24 will give a correct indication of the hardness of the material to be tested. An inconvenience of this method, is, however, that the image of the lenticular indentation 19 visible on the screen 34 will be fore-shortened in the transverse direction of the lenticular impression to such an extent that the images 41 and 42 of the end points 23 and 24 of the impression will not be easily observed with precision. This difficutly is avoided if the indenting tool is left in the indentation while readings are being taken. Each end 41 and 42 of the dimension to be observed is then at the intersection of the sharply focussed images 39 and 40 of the curved indenter edge 12 and the equally curved shadow thereof on the surface 15'. The curves 39 and 40 meet at comparatively large angles, so that the observation of the points 41 and 42 does not entail any difficulty. The central area 37, 38 of the image visible on the screen 34 is quite dark whereas to either side of the V-shaped contour lines of that central area there is a brightly illuminated area permitting very accurate readings of the points 41, 42.

The optical system may either be fixedly mounted on the indenter rod 25 so as to participate in any movements of the latter or the mounting of the optical system may be such that the system can be lifted and lowered relative to the rod 25 in a manner suitable to permit readings while the indenter is in the indentation produced in the specimen. For example, the construction may be such that the innermost portion of the bracket 26 is in the form of a sleeve which slideably surrounds the rod 25 and in its lowered position rests upon a collar 25' of the rod 25. Whether the optical system is fixed or slideably mounted on the rod 25, there is no need for re-focussing the optical system for each successive specimen. When the system has once been focussed for obtaining a sharp image of the indenter edge on the projection surface 34, this adjustment may be maintained for an indefinite number of tests despite the fact that the indenter has to be moved from an inactive raised position down into the specimen during each test and then up again for the removal of the specimen just tested and the insertion of a new specimen into the machine. This adjustment is also independent of differences in the thickness of successive specimens.

In the modified form of optical equipment shown in Figs. 5 and 6 movable optical means 45 adapted to deviate or bend light rays are arranged in the path of the light rays passing from the projecting lens 33 to the projection screen 34. The optical means 45 are so arranged and constructed as to bend light rays reflected from the specimen adjacent to one-half of the cutting edge of the tool in a different manner than rays reflected from the specimen adjacent to the opposite half of said cutting edge. In the example shown the deviating device 45 is composed of two thin optical prisms 45' and 45" structurally combined to one thin triangular prism 45. The base 49 of this prism 45 (see Figs. 8 and 9) extends perpendicularly to the axis of the light beam traversing it and the common edge 50 of its two side faces 51 and 52 is perpendicular to the dimension to be measured of the indentation 19 in the specimen 15. Each half of the prism 45, that is to say each of the two optical prisms 45' and 45", deviates half of the reflected light beam passing through the projection lens 33 towards the center line of that beam. The prism 45 is carried by a slide 46 which is shiftably mounted on a rod or track 67 so that the position of this prism may be varied along that track. The slide 46 carries an index 47 playing on a scale 48.

Fig. 7 indicates a beam of light as produced by the projecting lens 33 without the interposition of the prism 45. Rays 53 and 54 coming from the two end points 23, 24 of an object, which may be the indentation 19, will cast on the projection surface 34 images 41 and 42 at a distance $a$ from each other. With the prism 45 interposed in the path of the light beam, each half of the prism 45 produces a small, constant angular deviation of the light rays traversing it toward the midline of the light beam, and two overlapping images are seen on the screen 33. The light from the left end 23 of the indentation going through the half 45" of the prism 45 forms an image 55 on the screen displaced to the left. Similarly, the light from the right end 24 of the indentation going through the left half 45' of the prism 45 forms another image 56 on the screen displaced to the right. As a consequence of this deviation of the two halves of the light beam the images 41, 42 of the two end points 23, 24 of the indentation appear on the screen 34 at the reduced distance $b$. By moving the prism 45 from the position shown in Fig. 8 upwardly or downwardly, the distance $b$ can be increased or reduced, respectively, to a desired value. In particular, this distance can be reduced to zero, by moving the prism 45 so far down that the two images 41, 42 coincide as shown in Fig. 9.

The distance the prism 45 would have to be moved from the position in which it does not affect the distance $a$ between the images 41 and 42 on the screen 34, which position would be in the plane of the screen 34, to the position shown in Fig. 9 in which these two images 41, 42 coincide is proportional to said distance $a$ itself. Since this distance $a$ is proportional to the dimension of the indentation to be measured, the displacement of the prism from the initial position mentioned to the position in which it brings the points 41, 42 into coincidence can be used as a measure of the chosen dimension of the indentation. If the scale 48 is calibrated in hardness units, and fractions thereof, the position of the pointer 47 will indicate directly the hardness of the specimen tested.

By properly choosing the optical constants of the projection system and of the prism 45 the length available for the scale 48 may be made any desired value. It will be obvious that the reading of the scale will be easier and the more accurate the longer the scale 48 is. In general, the length of the scale 48 will be chosen several times as long as the distance $a$ between the points 41 and 42 would appear on the screen 34.

To permit readings also on the screen 34 whenever desired, this screen may have a scale 43 as described in connection with Fig. 2 and the prism 45 may be so mounted that it can be moved out of the path of the reflected light rays passing from the projecting lens 33 to the projection screen 34. As an example for such an arrangement Figs. 5 and 6 show the guide rod 67 as having a portion 59 of reduced thickness around which portion the prism carrier 46 with the prism 45 may be turned into the position shown in Fig. 5 in dotted lines after the prism has been moved along the rod 67 up to the portion 59. To permit the turning of the prism carrier 46 with the prism 45 out of the casing 32 into the dotted position, this casing has a slot 60 corresponding in height more or less with the reduced portion 59 of the rod 67.

While the prism carrier 46 may be mounted on a rod 67 as indicated in Fig. 6 and may be moved along this rod by operating it by means of the pointer 47 by hand, in the preferred arrangement shown in Figs. 5 and 6' the prism carrier is movable up and down the guide rod 67 by means of a suitable transmission. For instance, the guide rod may be screw-threaded and the part of the prism carrier which surrounds the rod 67 may be in the form of a nut cooperating with the screw thread on the rod 67. If the prism carrier 46 is guided by the casing 32 to prevent rotation and the rod 67 is rotated by means of the handle 61 in one or the other direction, the prism carrier 46 together with the prism 45 is moved up or down the rod 67. There is no thread on the reduced portion 59 of the rod 67. When it is desired to observe the dimension 41—42 directly on the screen 34, the prism 45 is moved upwardly in the manner described to the reduced portion 59 of the rod 67 where there is an opening in one side of the housing 32. By means of the pointer 47 prism 45 is turned out of the path of the light rays so that the device will operate in the same manner as the one described in connection with Figs. 1 to 4. When it becomes desirable again to use the scale 48, the prism carrier with the prism is swung back into the casing 32 and then moved downwardly until the images 41, 42 visible on the screen 34 are the predetermined distance $b$ from each other, such as the distance zero.

The method which determines the hardness of specimens by bringing the points 41 and 42 to coincidence lends itself particularly well for carrying out mass testing of specimens of supposedly similar kind. Assuming that such specimens are to be considered acceptable if their hardness remains within a certain tolerance, two indices 57 and 58, as diagrammatically indicated in Fig. 9, may be shiftably mounted on the screen 34 so that they can be set to the desired tolerance limits. Then, as long as the displaced images 41, 42 of the end points of the indentation lie between the indices 57 and 58 the specimens are acceptable.

In making a hardness reading with either the device shown in Fig. 1 or the device shown in Fig. 5, the specimen 15 is mounted under the indenter or penetrator 12, the standard test load is applied to the indenter, and a light beam is thrown by means of the lamp 29 and the condensing lens 31 upon the tip of the indenting tool 11 and the surface 15' of the specimen 15. The light beam striking the surface 15' under a small angle of incidence is reflected under a similar small angle into the projection lens 33 and passes from there to the screen 34 where it forms the images 37 and 38, these images having their points of intersection 41 and 42 either at an undistorted distance $a$ as in Figs. 2 and 7 when the optical device of Fig. 1 is used, or coinciding in one point when the deviating device of Fig. 5 is used.

Both the scale 43 on the screen 34 and the extended scale 48 may be mounted so as to be easily replaceable by scales of different calibration. Between the hardness scales of all the hardness testing systems mentioned at the beginning of this specification there exists an equational relation which makes it possible to adapt the machine for the use of a different indenter simply by the use of a different scale. It is also possible, of course, to provide more than one scale on the same scale carrier.

I desire it to be understood that the invention is not limited to the particular constructional embodiments shown and described hereinbefore but that these embodiments have been given as illustrative examples only, since it will be obvious that various changes and modifications may be made without departing from the spirit of the invention or the scope of the appended claims.

What I claim is:

1. In a hardness testing device an indenting tool, means for applying said tool to a specimen to be tested for making an indentation therein, a light source, a condensing lens having its optical axis extending at an acute angle towards said specimen so that the light passing from said light source through said condensing lens is reflected by said specimen at an acute angle to the latter, a projecting lens in the path of the light reflected by said specimen, a projection screen located a fixed distance from said indentation for receiving the reflected light rays after their passage through said projecting lens, optical means between said projecting lens and said screen adapted to deviate through a fixed angle and in different directions different portions of the beam of light passing through said optical means, said optical means being movable in the direction of the axis of said beam, a scale extending parallel to said axis of said beam, and an indicator connected to said movable optical means and slideable along said scale.

2. In a hardness testing device an indenting tool, means for applying said tool to a specimen to be tested for making an indentation therein, a light source, a condensing lens having its optical axis extending at an acute angle towards said specimen so that the light passing from said light source through said condensing lens is reflected by said specimen at an acute angle to the latter, a projecting lens in the path of the light reflected by said specimen, a projection screen located a fixed distance from said indentation for receiving the reflected light rays after their passage through said projecting lens, optical means between said projecting lens and said screen adapted to deviate through a fixed angle and in different directions different portions of the beam of light passing through said optical means, said optical means being movable in the direction of the axis of said beam, and two indices adjustably mounted on said projection screen so as to delimit a tolerance range of hardness.

3. In a hardness testing device an indenting tool, means for applying said tool to a specimen to be tested for making an indentation therein, a light source, a condensing lens having its optical axis extending at an acute angle towards said specimen so that the light passing from said light source through said condensing lens is reflected by said specimen at an acute angle to the latter, a projecting lens in the path of the light reflected by said specimen, a projection screen located a fixed distance from said indentation for receiving the reflected light rays after their passage through said projecting lens, a scale on said projection screen, optical means between said projecting lens and said screen adapted to deviate through a fixed angle and in different directions different portions of the beam of light passing through said optical means, said optical means being movable in the direction of the axis of said beam, a scale extending parallel to said axis of said beam, an indicator connected to said movable optical means and slideable along said scale, and two indices adjustably mounted on said first named scale on said projection screen so as to delimit a tolerance range of hardness.

4. In a device for measuring the hardness of a specimen by the projection of a distance across the indentation, in combination, a frame adapted to support a specimen, a weighted indentor bearing against the specimen, a light source projecting a beam of light at an acute angle onto the specimen around the indentor, a tube containing a lens through which the beam reflected by the specimen passes, a screen at a fixed distance from the indentation on which is cast an image of the distance across the indentor at the surface of the specimen, a slide movable in the tube, prisms rigidly mounted on the slide and adapted to displace in opposite directions the ends of the image on the screen, coacting pointer and scale carried by slide and tube respectively.

5. In a device for measuring the hardness of a specimen by the projection of a distance across the indentation, in combination, a frame adapted to support a specimen, a weighted indentor bearing against the specimen, a light source projecting a beam of light at an acute angle onto the specimen around the indentor, a tube containing a lens through which the beam reflected by the specimen passes, a screen at a fixed distance from the indentation on which is cast an image of the distance across the indentor at the surface of the specimen, a slide movable in the tube, prisms rigidly mounted on the slide and adapted to displace in opposite directions the ends of the image on the screen, coacting pointer and scale carried by slide and tube respectively, means permitting moving the slide laterally out of the light beam when the slide has been moved along the tube carrying the pointer beyond the effective scale range.

CARLETON V. KENT.

(References on following page)

REFERENCES CITED

The following references are of record in the file of this patent:

UNITED STATES PATENTS

| Number | Name | Date |
|---|---|---|
| 1,371,458 | Wilson | Mar. 5, 1921 |
| 1,875,134 | Pfund | Aug. 30, 1932 |
| 2,217,388 | Smith | Oct. 6, 1940 |
| 2,243,235 | Von Weingraber et al. | May 27, 1941 |
| 2,335,235 | Clifton | Nov. 30, 1943 |
| 2,349,989 | Reason | May 30, 1944 |
| 2,406,451 | Borkenstein | Aug. 27, 1946 |

FOREIGN PATENTS

| Number | Country | Date |
|---|---|---|
| 503,072 | Germany | July 23, 1930 |